United States Patent
Thomsen

(10) Patent No.: US 10,642,660 B2
(45) Date of Patent: May 5, 2020

(54) DATABASE VARIABLE SIZE ENTRY CONTAINER PAGE REORGANIZATION HANDLING BASED ON USE PATTERNS

(71) Applicant: SAP SE, Walldorf (DE)

(72) Inventor: Dirk Thomsen, Berlin (DE)

(73) Assignee: SAP SE, Walldorf (DE)

( * ) Notice: Subject to any disclaimer, the term of this patent is extended or adjusted under 35 U.S.C. 154(b) by 60 days.

(21) Appl. No.: 15/600,578

(22) Filed: May 19, 2017

(65) Prior Publication Data

US 2018/0336126 A1    Nov. 22, 2018

(51) Int. Cl.
| | |
|---|---|
| *G06F 3/06* | (2006.01) |
| *G06F 12/12* | (2016.01) |
| *G06F 9/50* | (2006.01) |
| *G06F 16/20* | (2019.01) |
| *G06F 16/21* | (2019.01) |

(52) U.S. Cl.
CPC ............ *G06F 9/5077* (2013.01); *G06F 16/20* (2019.01); *G06F 16/217* (2019.01)

(58) Field of Classification Search
None
See application file for complete search history.

(56) References Cited

U.S. PATENT DOCUMENTS

| | | | |
|---|---|---|---|
| 7,421,446 B1* | 9/2008 | Bruso | G06F 16/284 |
| 7,500,077 B2* | 3/2009 | Krauss | G06F 11/3409 |
| | | | 711/170 |
| 2004/0107405 A1* | 6/2004 | Schein | G06F 9/52 |
| 2008/0177923 A1* | 7/2008 | Klein | G06F 13/1673 |
| | | | 710/306 |
| 2010/0146213 A1* | 6/2010 | Yao | G06F 12/0802 |
| | | | 711/136 |
| 2010/0161572 A1* | 6/2010 | Daum | G06F 9/526 |
| | | | 707/704 |
| 2013/0067187 A1* | 3/2013 | Moss | G06F 3/0689 |
| | | | 711/170 |
| 2013/0159339 A1* | 6/2013 | Thomsen | G06F 17/30106 |
| | | | 707/769 |
| 2013/0346705 A1* | 12/2013 | Pyla | G06F 12/0804 |
| | | | 711/142 |
| 2014/0279961 A1* | 9/2014 | Schreter | G06F 17/30315 |
| | | | 707/693 |
| 2014/0297777 A1* | 10/2014 | Thomsen | G06F 3/061 |
| | | | 709/212 |
| 2015/0095292 A1* | 4/2015 | Dryfoos | G06F 17/30135 |
| | | | 707/693 |
| 2016/0357455 A1* | 12/2016 | Kim | G06F 3/0611 |

* cited by examiner

*Primary Examiner* — Tracy C. Chan
(74) *Attorney, Agent, or Firm* — Jones Day

(57) ABSTRACT

A page is loaded into memory of an in-memory database system. Thereafter, it is determined whether to reorganized the page based on how such page is used. Based on such determination, the page is either reorganized by filling any free space gaps in memory and then, use of the reorganized page is enabled or, otherwise, use of the page is enabled without reorganization.

20 Claims, 4 Drawing Sheets

DATABASE VARIABLE SIZE ENTRY CONTAINER PAGE REORGANIZATION HANDLING BASED ON USE PATTERNS

TECHNICAL FIELD

The subject matter described herein relates to enhanced techniques for handling reorganization of pages having variable entry sizes loaded into memory of an in-memory database system.

BACKGROUND

In-memory databases are database management systems that rely on main memory for computer data storage. With such databases, pages are loaded into memory which provide for more rapid and efficient access to data encapsulated within such pages. As these pages are modified, entries can be added or deleted which can result in gaps within such pages.

SUMMARY

In one aspect, a page is loaded into memory of an in-memory database system. Thereafter, it is determined whether to reorganized the page based on how such page is used. Based on such determination, the page is either reorganized by filling any free space gaps in memory and then, use of the reorganized page is enabled or, otherwise, use of the page is enabled without reorganization.

The determining can include measuring a number of different entry sizes used by the page.

The determining can include measuring an amount of fragmentation within the page. Further, the determining can be based on whether there are uniform entry sizes in the page. In addition or in the alternative, the determining can be based on whether the page is configured such that new entries are added and oldest entries are deleted when space is needed.

Information about the page can be stored in a transient data structure in a persistence layer of the in-memory database system identifying free space within the page and deleted entries within the page that can be reused.

The page can be one of a plurality of pages forming a page chain. The page chain can be encapsulated within a variable size entry data container.

The reorganizing can cause the page to have a first portion with entries and a second, different portion, of contiguous free space.

Non-transitory computer program products (i.e., physically embodied computer program products) are also described that store instructions, which when executed by one or more data processors of one or more computing systems, cause at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g., the Internet, a wireless wide area network, a local area network, a wide area network, a wired network, or the like), via a direct connection between one or more of the multiple computing systems, etc.

The subject matter described herein provides many technical advantages. For example, the current subject matter provides for quicker and more efficient (processor-wise) allocation of entries into pages loaded into memory of an in-memory database system.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

Like reference symbols in the various drawings indicate like elements.

DETAILED DESCRIPTION

Figure 1:
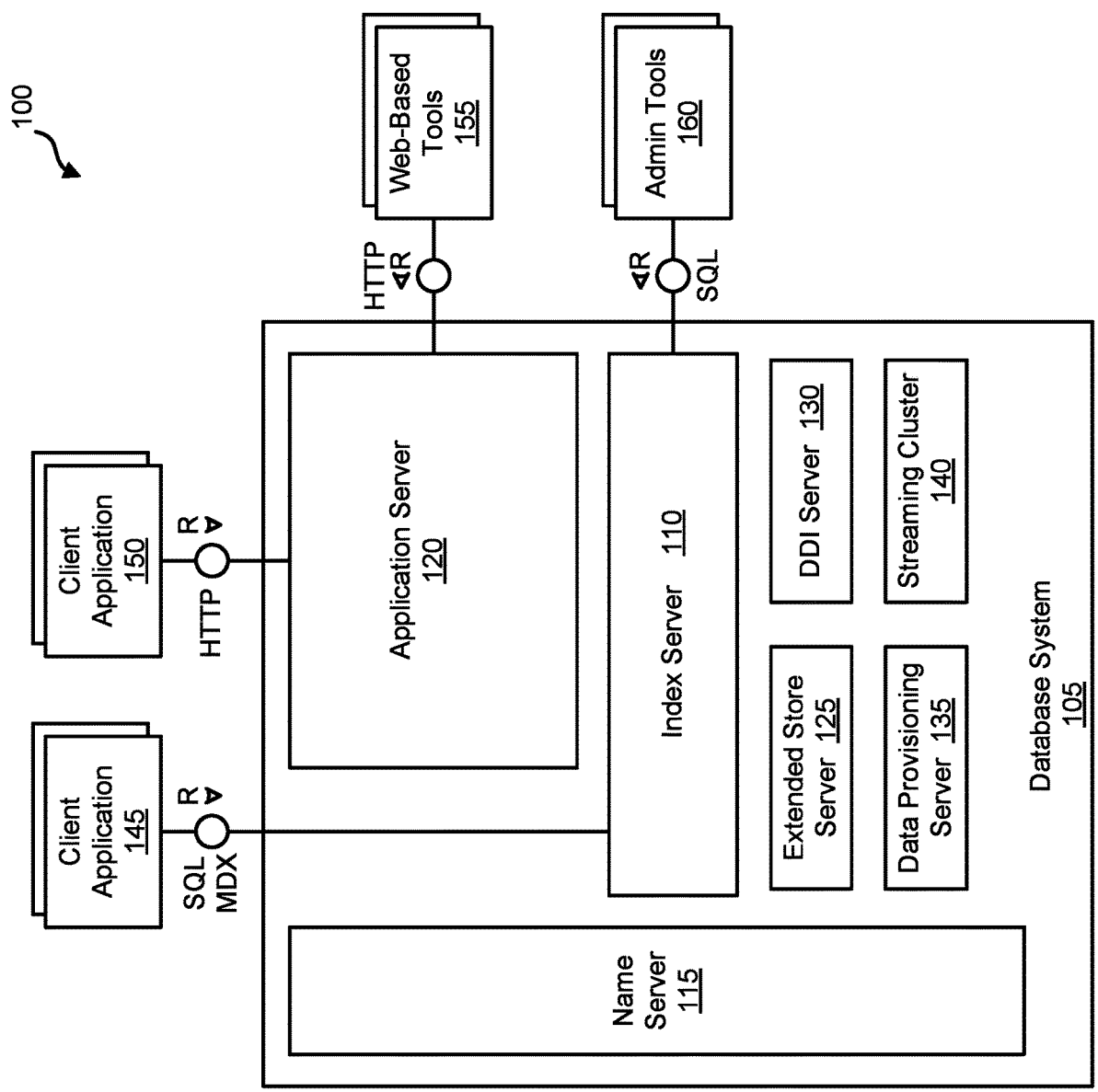
FIG. 1 is a system diagram illustrating an example database system for use in connection with the current subject matter.

FIG. 1 is a diagram 100 illustrating a database system 105 that can be used to implement aspects of the current subject matter. The database system 105 can, for example, be an in-memory database in which all relevant data is kept in main memory so that read operations can be executed without disk I/O and in which disk storage is required to make any changes durables. The database system 105 can include a plurality of servers including, for example, one or more of an index server 110, a name server 115, and/or an application server 120. The database system 105 can also include one or more of an extended store server 125, a database deployment infrastructure (DDI) server 130, a data provisioning server 135, and/or a streaming cluster 140. The database system 105 can be accessed by a plurality of remote clients 145, 150 via different protocols such as SQL/MDX (by way of the index server 110) and/or web-based protocols such as HTTP (by way of the application server 120).

The index server 110 can contain in-memory data stores and engines for processing data. The index server 110 can also be accessed by remote tools (via, for example, SQL queries), that can provide various development environment and administration tools. Additional details regarding an example implementation of the index server 110 is described and illustrated in connection with diagram 300 of FIG. 3.

The name server 115 can own information about the topology of the database system 105. In a distributed database system, the name server 115 can know where various components are running and which data is located on which server. In a database system 105 with multiple database containers, the name server 115 can have information about existing database containers and it can also hosts the system database. For example, the name server 115 can manage the information about existing tenant databases. Unlike a name server 115 in a single-container system, the name server 115 in a database system 105 having multiple database containers does not store topology information such as the location of tables in a distributed database. In a multi-container database system 105 such database-level topology information can be stored as part of the catalogs of the tenant databases.

The application server 120 can enable native web applications used by one or more remote clients 150 accessing the database system 105 via a web protocol such as HTTP. The application server 120 can allow developers to write and run various database applications without the need to run an additional application server. The application server 120 can also used to run web-based tools 155 for administration, life-cycle management and development. Other administration and development tools 160 can directly access the index server 110 for, example, via SQL and other protocols.

The extended store server 125 can be part of a dynamic tiering option that can include a high-performance disk-based column store for very big data up to the petabyte range and beyond. Less frequently accessed data (for which is it non-optimal to maintain in main memory of the index server 110) can be put into the extended store server 125. The dynamic tiering of the extended store server 125 allows for hosting of very large databases with a reduced cost of ownership as compared to conventional arrangements.

The DDI server 130 can be a separate server process that is part of a database deployment infrastructure (DDI). The DDI can be a layer of the database system 105 that simplifies the deployment of database objects using declarative design time artifacts. DDI can ensure a consistent deployment, for example by guaranteeing that multiple objects are deployed in the right sequence based on dependencies, and by implementing a transactional all-or-nothing deployment.

The data provisioning server 135 can provide enterprise information management and enable capabilities such as data provisioning in real time and batch mode, real-time data transformations, data quality functions, adapters for various types of remote sources, and an adapter SDK for developing additional adapters.

The streaming cluster 140 allows for various types of data streams (i.e., data feeds, etc.) to be utilized by the database system 105. The streaming cluster 140 allows for both consumption of data streams and for complex event processing.

Figure 2:
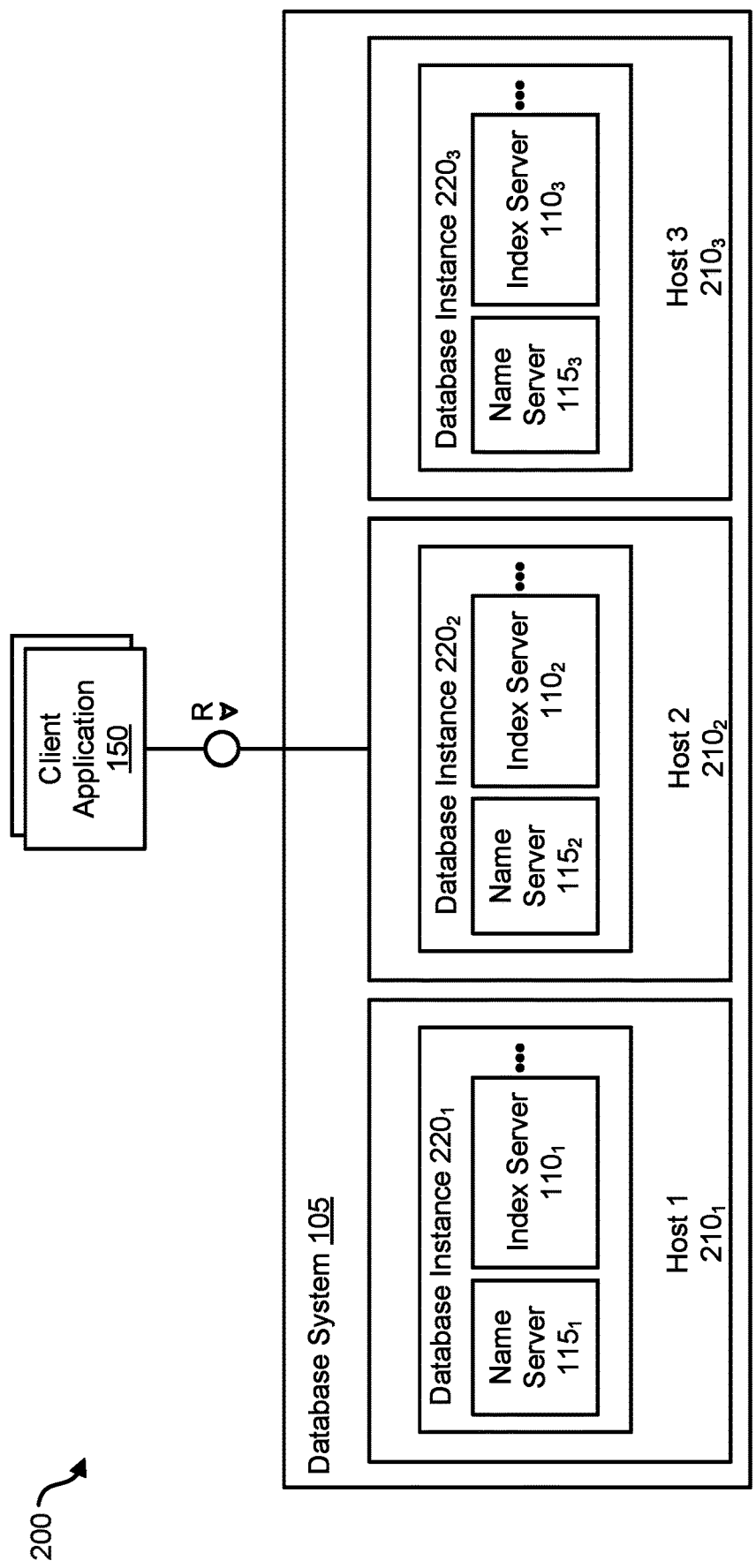
FIG. 2 is a system diagram illustrating an example database system that can support distribution of server components across multiple hosts for scalability and/or availability purposes for use in connection with the current subject matter.

FIG. 2 is a diagram 200 illustrating a variation of the database system 105 that can support distribution of server components across multiple hosts for scalability and/or availability purposes. This database system 105 can, for example, be identified by a single system ID (SID) and it is perceived as one unit from the perspective of an administrator, who can install, update, start up, shut down, or backup the system as a whole. The different components of the database system 105 can share the same metadata, and requests from client applications 230 can be transparently dispatched to different servers $110_{1-3}$, $120_{1-3}$, in the system, if required.

As is illustrated in FIG. 2, the distributed database system 105 can be installed on more than one host $210_{1-3}$. Each host $210_{1-3}$ is a machine that can comprise at least one data processor (e.g., a CPU, etc.), memory, storage, a network interface, and an operation system and which executes part of the database system 105. Each host $210_{1-3}$ can execute a database instance $220_{1-3}$ which comprises the set of components of the distributed database system 105 that are installed on one host $210_{1-3}$. FIG. 2 shows a distributed system with three hosts, which each run a name server $110_{1-3}$, index server $120_{1-3}$, and so on (other components are omitted to simplify the illustration).

Figure 3:
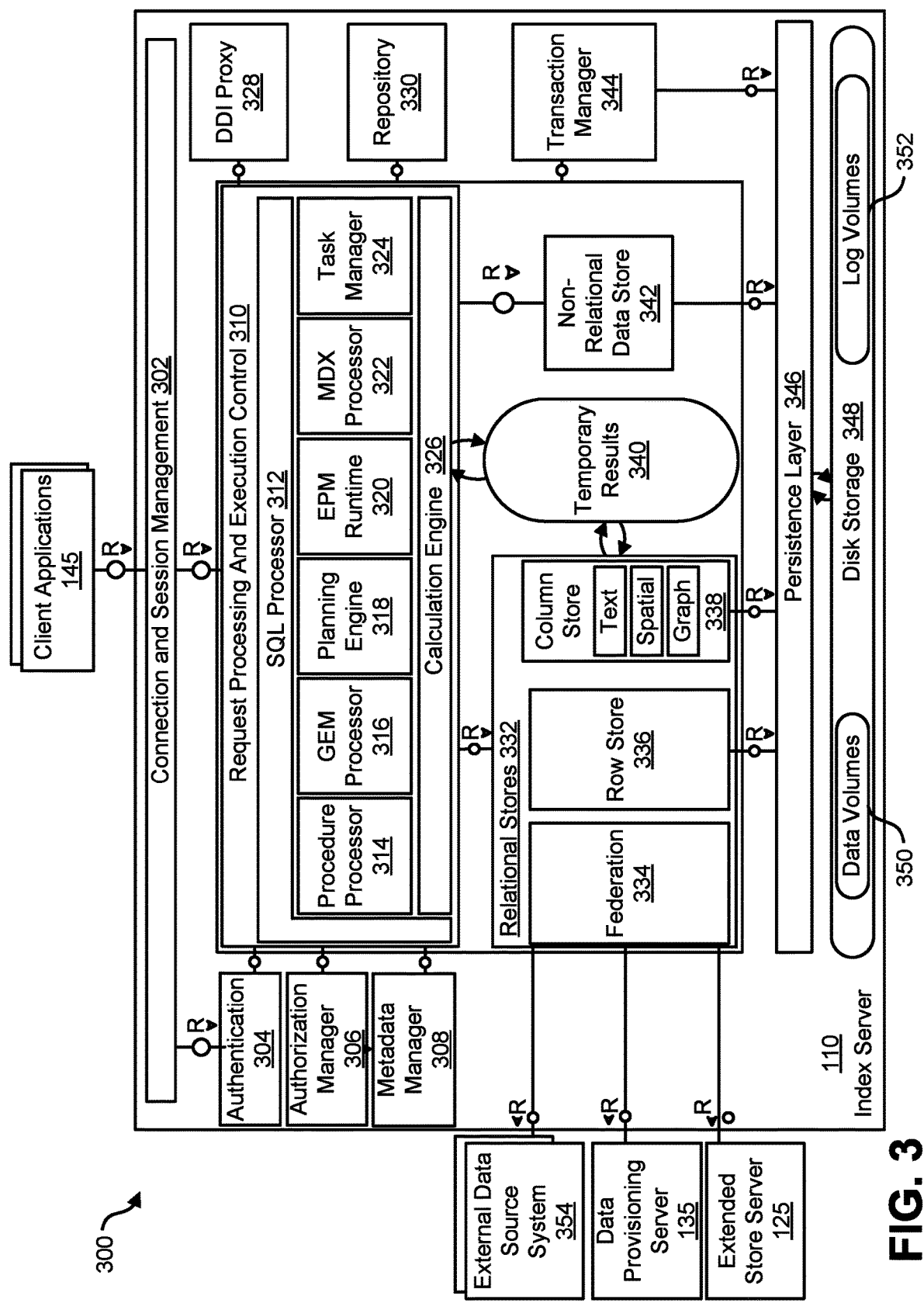
FIG. 3 is a diagram illustrating an architecture for an index server for use in connection with the current subject matter.

FIG. 3 is a diagram 300 illustrating an architecture for the index server 110 (which can, as indicated above, be one of many instances). A connection and session management component 302 can create and manage sessions and connections for the client applications 150. For each session, a set of parameters can be maintained such as, for example, auto commit settings or the current transaction isolation level.

Requests from the client applications 150 can be processed and executed by way of a request processing and execution control component 310. The database system 105 offers rich programming capabilities for running application-specific calculations inside the database system. In addition to SQL, MDX, and WIPE, the database system 105 can provide different programming languages for different use cases. SQLScript can be used to write database procedures and user defined functions that can be used in SQL statements. The L language is an imperative language, which can be used to implement operator logic that can be called by SQLScript procedures and for writing user-defined functions.

Once a session is established, client applications 150 typically use SQL statements to communicate with the index server 110 which can be handled by a SQL processor 312 within the request processing and execution control component 310. Analytical applications can use the multidimensional query language MDX (MultiDimensional eXpressions) via an MDX processor 322. For graph data, applications can use GEM (Graph Query and Manipulation) via a GEM processor 316, a graph query and manipulation language. SQL statements and MDX queries can be sent over the same connection with the client application 150 using the same network communication protocol. GEM statements can be sent using a built-in SQL system procedure.

The index server 110 can include an authentication component 304 that can be invoked with a new connection with a client application 150 is established. Users can be authenticated either by the database system 105 itself (login with user and password) or authentication can be delegated to an external authentication provider. An authorization manager 306 can be invoked by other components of the database system 150 to check whether the user has the required privileges to execute the requested operations.

Each statement can processed in the context of a transaction. New sessions can be implicitly assigned to a new transaction. The index server 110 can include a transaction manager 344 that coordinates transactions, controls transactional isolation, and keeps track of running and closed transactions. When a transaction is committed or rolled back, the transaction manager 344 can inform the involved engines about this event so they can execute necessary actions. The transaction manager 344 can provide various types of concurrency control and it can cooperate with a persistence layer 346 to achieve atomic and durable transactions.

Incoming SQL requests from the client applications 150 can be e received by the SQL processor 312. Data manipulation statements can be executed by the SQL processor 312 itself. Other types of requests can be delegated to the respective components. Data definition statements can be dispatched to a metadata manager 306, transaction control statements can be forwarded to the transaction manager 344, planning commands can be routed to a planning engine 318, and task related commands can forwarded to a task manager 324 (which can be part of a larger task framework) Incoming MDX requests can be delegated to the MDX processor 322. Procedure calls can be forwarded to the procedure processor 314, which further dispatches the calls, for example to a calculation engine 326, the GEM processor 316, a repository 300, or a DDI proxy 328.

The index server 110 can also include a planning engine 318 that allows planning applications, for instance for financial planning, to execute basic planning operations in the database layer. One such basic operation is to create a new version of a data set as a copy of an existing one while applying filters and transformations. For example, planning data for a new year can be created as a copy of the data from the previous year. Another example for a planning operation is the disaggregation operation that distributes target values from higher to lower aggregation levels based on a distribution function.

The SQL processor 312 can include an enterprise performance management (EPM) runtime component 320 that can form part of a larger platform providing an infrastructure for developing and running enterprise performance management applications on the database system 105. While the planning engine 318 can provide basic planning operations, the EPM platform provides a foundation for complete planning applications, based on by application-specific planning models managed in the database system 105.

The calculation engine 326 can provide a common infrastructure that implements various features such as SQLScript, MDX, GEM, tasks, and planning operations. The SQLScript processor 312, the MDX processor 322, the planning engine 318, the task manager 324, and the GEM processor 316 can translate the different programming languages, query languages, and models into a common representation that is optimized and executed by the calculation engine 326. The calculation engine 326 can implement those features using temporary results 340 which can be based, in part, on data within the relational stores 332.

Metadata can be accessed via the metadata manager component 308. Metadata, in this context, can comprise a variety of objects, such as definitions of relational tables, columns, views, indexes and procedures. Metadata of all these types can be stored in one common database catalog for all stores. The database catalog can be stored in tables in a row store 336 forming part of a group of relational stores 332. Other aspects of the database system 105 including, for example, support and multi-version concurrency control can also be used for metadata management. In distributed systems, central metadata is shared across servers and the metadata manager 308 can coordinate or otherwise manage such sharing.

The relational stores 332 form the different data management components of the index server 110 and these relational stores can, for example, store data in main memory. The row store 336, a column store 338, and a federation component 334 are all relational data stores which can provide access to data organized in relational tables. The column store 338 can stores relational tables column-wise (i.e., in a column-oriented fashion, etc.). The column store 338 can also comprise text search and analysis capabilities, support for spatial data, and operators and storage for graph-structured data. With regard to graph-structured data, from an application viewpoint, the column store 338 could be viewed as a non-relational and schema-flexible in-memory data store for graph-structured data. However, technically such a graph store is not a separate physical data store. Instead it is built using the column store 338, which can have a dedicated graph API.

The row store 336 can stores relational tables row-wise. When a table is created, the creator can specify whether it should be row or column-based. Tables can be migrated between the two storage formats. While certain SQL extensions are only available for one kind of table (such as the "merge" command for column tables), standard SQL can be used on all tables. The index server 110 also provides functionality to combine both kinds of tables in one statement (join, sub query, union).

The federation component 334 can be viewed as a virtual relational data store. The federation component 334 can provide access to remote data in external data source system(s) 354 through virtual tables, which can be used in SQL queries in a fashion similar to normal tables.

The database system 105 can include an integration of a non-relational data store 342 into the index server 110. For example, the non-relational data store 342 can have data represented as networks of C++ objects, which can be persisted to disk. The non-relational data store 342 can be used, for example, for optimization and planning tasks that operate on large networks of data objects, for example in supply chain management. Unlike the row store 336 and the column store 338, the non-relational data store 342 does not use relational tables; rather, objects can be directly stored in containers provided by the persistence layer 346. Fixed size entry containers can be used to store objects of one class. Persisted objects can be loaded via their persisted object IDs, which can also be used to persist references between objects. In addition, access via in-memory indexes is supported. In that case, the objects need to contain search keys. The in-memory search index is created on first access. The non-relational data store 342 can be integrated with the transaction manager 344 to extends transaction management with sub-transactions, and to also provide a different locking protocol and implementation of multi version concurrency control.

An extended store is another relational store that can be used or otherwise form part of the database system 105. The extended store can, for example, be a disk-based column store optimized for managing very big tables, which ones do not want to keep in memory (as with the relational stores 332). The extended store can run in an extended store server 125 separate from the index server 110. The index server 110 can use the federation component 334 to send SQL statements to the extended store server 125.

The persistence layer 346 is responsible for durability and atomicity of transactions. The persistence layer 346 can ensure that the database system 105 is restored to the most recent committed state after a restart and that transactions are either completely executed or completely undone. To achieve this goal in an efficient way, the persistence layer 346 can use a combination of write-ahead logs, undo and cleanup logs, shadow paging and savepoints. The persistence layer 346 can provide interfaces for writing and reading persisted data and it can also contain a logger component that manages a recovery log. Recovery log entries can be written in the persistence layer 352 (in recovery log volumes 352) explicitly by using a log interface or implicitly when using the virtual file abstraction. The recovery log volumes 352 can include redo logs which specify database operations to be replayed whereas data volume 350 contains undo logs which specify database operations to be undone as well as cleanup logs of committed operations which can be executed by a garbage collection process to reorganize the data area (e.g. free up space occupied by deleted data etc.).

The persistence layer 346 stores data in persistent disk storage 348 which, in turn, can include data volumes 350 and/or recovery log volumes 352 that can be organized in pages which can form one or more page chains. Different page sizes can be supported, for example, between 4 k and 16 M. Data can be loaded from the disk storage 348 and stored to disk page wise. For read and write access, pages can be loaded into a page buffer in memory. The page buffer need not have a minimum or maximum size, rather, all free memory not used for other things can be used for the page buffer. If the memory is needed elsewhere, least recently used pages can be removed from the cache. If a modified page is chosen to be removed, the page first needs to be persisted to disk storage 348. While the pages and the page buffer are managed by the persistence layer 346, the in-memory stores (i.e., the relational stores 332) can access data within loaded pages.

The pages included in data volumes 350 can be configured to store entries of variable sizes. Deleting entries in these variably sized pages can result in fragmentation. A transient data structure can be used to store information about pages in the persistence layer 346 with free space and deleted entries that can be reused.

Initially, after loading of a page into memory (one of the relational stores 332), it is determined whether such page should be reorganized. Such determination can be based, for example, on whether the page is fragmented and/or how the page is configured. For example, if the page is fragmented with entries of different sizes, the page can be reorganized causing a first portion of the page to be contiguously filled with entries and a second portion of the page having free space. However, if the page is fragmented with entries having the same size, then such gaps in free space can be easily reused (i.e., the gaps can be filled thereby eventually filling all gaps). In some cases, the number of entries with varying sizes needs to exceed a certain threshold to justify the overhead required to reorganize the page.

After the page is reorganized or it is determined that it does not need to be reorganized, such page can be used. There can a phase in which the page is virtually locked to check checksum, etc. and within this phase only the thread loading the page can access such page. This thread can also handle any kind of reorganization, as no other thread can access the page in parallel.

Figure 4:
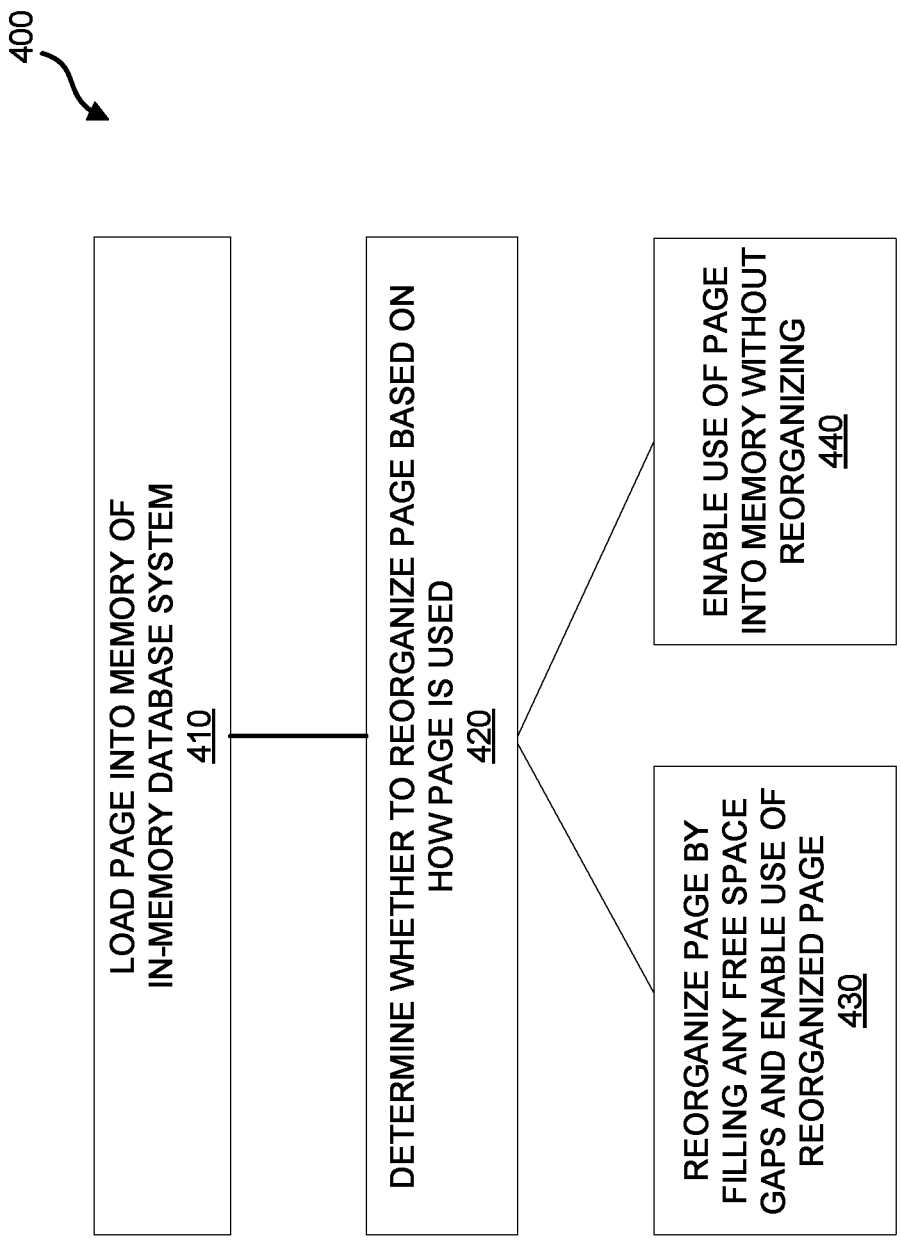
FIG. 4 is a process flow diagram illustrating page reorganization handling for pages having variable sized entries.

FIG. 4 is a process flow diagram 400 in which, at 410, a page is loaded into memory of an in-memory database system. Thereafter, at 420, it is determined whether to reorganized the page based on how such page is used. Based on this determination either, at 430, the page is reorganized by filling any free space gaps in memory if it is determined to reorganize the page and use of the reorganized page is enabled, or, at 440, use of the page is enabled without reorganizing.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, the subject matter described herein may be implemented on a computer having a display device (e.g., a CRT (cathode ray tube) or LCD (liquid crystal display) monitor) for displaying information to the user and a keyboard and a pointing device (e.g., a mouse or a trackball) and/or a touch screen by which the user may provide input to the computer. Other kinds of devices may be used to provide for interaction with a user as well; for example, feedback provided to the user may be any form of sensory feedback (e.g., visual feedback, auditory feedback, or tactile feedback); and input from the user may be received in any form, including acoustic, speech, or tactile input.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A computer-implemented method comprising:
loading a page into memory of an in-memory database system in which all relevant data is kept in such memory so that read operations can be executed without disk I/O and in which disk storage is required to make changes durable;
determining, by accessing a transient data structure, whether to reorganize the page based on how such page is used, wherein it is determined to reorganize the page if the page is fragmented with entries of different sizes and it is determined not to reorganize the page if the page is fragmented with entries having a uniform size;
reorganizing the page if it is determined to reorganize the page and enabling the reorganized page to be used, the reorganizing comprising filling in free space gaps of the page in memory such that the page has a first portion with entries and no free space gaps and a second, different portion, of contiguous free space; and
enabling the page to be used without reorganization if it is not determined to reorganize the page;
wherein:
the page is loaded into memory by a thread;
there is a phase in which the page is virtually locked to check checksum and within this phase only the thread loading the page can access such page, the thread also handles any kind of reorganization such that no other thread can access the page in parallel.

2. The method of claim 1, wherein the determining comprises measuring a number of different entry sizes used by the page.

3. The method of claim 1, wherein the determining comprises measuring an amount of fragmentation within the page.

4. The method of claim 3, wherein the determining is based on whether the page is configured such that new entries are added and oldest entries are deleted when space is needed.

5. The method of claim 1 further comprising:
storing information about the page in the transient data structure in a persistence layer of the in-memory database system identifying free space within the page and deleted entries within the page that can be reused.

6. The method of claim 1, wherein the page is one of a plurality of pages forming a page chain.

7. The method of claim 6, wherein the page chain is encapsulated within a variable size entry data container.

8. A system comprising:
at least one data processor; and
memory storing instructions which, when executed by the at least one data processor, results in operations comprising:
loading a page into memory of an in-memory database system, the in which all relevant data is kept in such memory so that read operations can be executed without disk I/O and in which disk storage is required to make changes durable;
determining, by accessing a transient data structure, whether to reorganize the page based on how such page is used, wherein it is determined to reorganize the page if the page is fragmented with entries of different sizes and it is determined not to reorganize the page if the page is fragmented with entries having a uniform size;
reorganizing the page if it is determined to reorganize the page and enabling the reorganized page to be used, the reorganizing comprising filling in free space gaps of the page in memory such that the page has a first portion with entries and no free space gaps and a second, different portion, of contiguous free space; and
enabling the page to be used without reorganization if it is not determined to reorganize the page;
wherein:
the page is loaded into memory by a;
there is a phase in which the page is virtually locked to check checksum and within this phase only the thread loading the page can access such page, the thread also handles any kind of reorganization such that no other thread can access the page in parallel.

9. The system of claim 8 further comprising an in-memory database system that includes the at least one data processor and the memory.

10. The system of claim 8, wherein the determining comprises measuring a number of different entry sizes used by the page.

11. The system of claim 8, wherein the determining comprises measuring an amount of fragmentation within the page.

12. The system of claim 11, wherein the determining is based on whether the page is configured such that new entries are added and oldest entries are deleted when space is needed.

13. The system of claim 8, wherein the operations further comprise:
storing information about the page in the transient data structure in a persistence layer of the in-memory database system identifying free space within the page and deleted entries within the page that can be reused.

14. The system of claim 8, wherein the page is one of a plurality of pages forming a page chain.

15. The system of claim 14, wherein the page chain is encapsulated within a variable size entry data container.

16. A non-transitory computer program product storing instructions which, when executed by at least one data processor forming part of at least one computing device, result in operations comprising:
loading a page into memory of an in-memory database system, the in which all relevant data is kept in such memory so that read operations can be executed without disk I/O and in which disk storage is required to make changes durable;
determining, by accessing a transient data structure, whether to reorganize the page based on how such page is used, wherein it is determined to reorganize the page if the page is fragmented with entries of different sizes and it is determined not to reorganize the page if the page is fragmented with entries having a uniform size;

reorganizing the page if it is determined to reorganize the page and enabling the reorganized page to be used, the reorganizing comprising filling in free space gaps of the page in memory such that the page has a first portion with entries and no free space gaps and a second, different portion, of contiguous free space; and enabling the page to be used without reorganization if it is not determined to reorganize the page;

wherein:
the page is loaded into memory by a thread;
there is a phase in which the page is virtually locked to check checksum and within this phase only the thread loading the page can access such page, the thread also handles any kind of reorganization such that no other thread can access the page in parallel.

17. The non-transitory computer program product of claim 16, wherein the determining comprises measuring a number of different entry sizes used by the page.

18. The non-transitory computer program product of claim 16, wherein the determining comprises measuring an amount of fragmentation within the page.

19. The non-transitory computer program product of claim 18, wherein the determining is based on whether the page is configured such that new entries are added and oldest entries are deleted when space is needed.

20. The non-transitory computer program product of claim 18, wherein the operations further comprise:

storing information about the page in the transient data structure in a persistence layer of the in-memory database system identifying free space within the page and deleted entries within the page that can be reused;

wherein:
the page is one of a plurality of pages forming a page chain;
the page chain is encapsulated within a variable size entry data container.

* * * * *